United States Patent
Davenport

[11] Patent Number: 5,545,936
[45] Date of Patent: Aug. 13, 1996

[54] C-STATOR TYPE SEGMENTED ZONED FIELD DC-MOTOR

[76] Inventor: Norban E. Davenport, 1677 Alta Vista Dr., Bull Head City, Ariz. 86442

[21] Appl. No.: 275,436

[22] Filed: Jul. 15, 1994

[51] Int. Cl.⁶ .................................................. H02K 41/00
[52] U.S. Cl. ............................ 310/12; 310/112; 310/166; 310/177; 310/254
[58] Field of Search ................................ 310/12, 112, 51, 310/166, 177, 184, 254

[56] References Cited

U.S. PATENT DOCUMENTS

| | | | |
|---|---|---|---|
| 1,871,446 | 8/1932 | Decker | 310/12 X |
| 3,292,065 | 12/1966 | Fredrickson | 310/12 X |
| 3,482,124 | 12/1969 | Pelenc | 310/12 |
| 3,700,943 | 10/1972 | Heintz et al. | 310/168 |
| 3,707,924 | 1/1973 | Barthalon et al. | 310/12 X |
| 3,721,874 | 3/1973 | Pelenc et al. | 310/12 X |
| 3,829,746 | 8/1974 | Van et al. | 310/12 X |
| 3,864,588 | 2/1975 | Inaba | 310/266 |
| 3,894,275 | 7/1975 | Baumans et al. | 310/12 X |
| 4,137,473 | 1/1979 | Pfister | 310/98 |
| 4,307,310 | 12/1981 | Wedman et al. | 310/177 |
| 4,330,727 | 5/1982 | Oudet | 310/268 |
| 4,381,465 | 4/1983 | Renkl et al. | 310/49 R |
| 4,408,138 | 10/1983 | Okamoto | 310/12 |
| 4,545,117 | 10/1985 | Okamoto | 29/596 |
| 4,633,108 | 12/1986 | von der Heide | 310/12 |
| 4,678,971 | 7/1987 | Kanazawa et al. | 310/12 X |
| 4,695,777 | 9/1987 | Asano | 310/12 X |
| 4,704,553 | 11/1987 | Resnicow | 310/12 |
| 4,823,040 | 4/1989 | Oudet | 310/268 |
| 4,837,474 | 6/1989 | Petersen et al. | 310/254 |
| 4,922,142 | 5/1990 | Givler, Jr. et al. | 310/12 |
| 4,931,677 | 6/1990 | Heidelberg et al. | 310/12 |
| 4,972,112 | 11/1990 | Kim | 310/181 |
| 4,990,809 | 2/1991 | Artus et al. | 310/192 |
| 5,177,391 | 1/1993 | Kusase | 310/263 |
| 5,177,416 | 1/1993 | Inaji et al. | 318/254 |
| 5,204,574 | 4/1993 | Kanno et al. | 310/233 |
| 5,214,336 | 5/1993 | Schmidt et al. | 310/254 |
| 5,235,225 | 8/1993 | Colgate et al. | 310/12 |
| 5,254,896 | 10/1993 | Bradfield et al. | 310/263 |
| 5,292,284 | 3/1994 | Denk et al. | 429/29 |

OTHER PUBLICATIONS

"A Linear Motor Using Claw Stators and Permanent Magnet Moving Member"; G. W. McLean et al.; University of Manchester, UK; pp. 183–186.

*Primary Examiner*—Mark O. Budd
*Attorney, Agent, or Firm*—Whitham, Curtis, Whitham & McGinn

[57] ABSTRACT

An electrical machine of the reluctance or permanent magnet type includes one or more pawns of high permeance material which are relatively moveable along a plurality of C-shaped stators which are regularly spaced at a predetermined stator pitch dimension. The pawn or pawns are of a length equal to or exceeding the stator pitch dimension such that as the pawn is pulled into the air gap of a stator which is energized, the magnetic field induced in the pawn or provided by a permanent magnet is coupled to a following stator which is not yet energized to avoid reverse acceleration of the pawn and reduce vibration. The field coupled to the following stator also reduces the power required to establish a desired level of magnetic flux in the following stator when the following stator is energized. The cross-section of the air gap of the stator and the pawn are closely matched to maintain a minimum air gap when the pawn passes through the air gap of each stator. The pawns are bilaterally symmetrical and mounted on the edge of a rotor disk to obtain high dimensional stability over a range of rotational speeds. The cross-sectional shape of the pawn and air gap of the stator preferably establish an area of the air gap which exceeds the cross-sectional area of the magnetic flux path through the pawn.

11 Claims, 6 Drawing Sheets

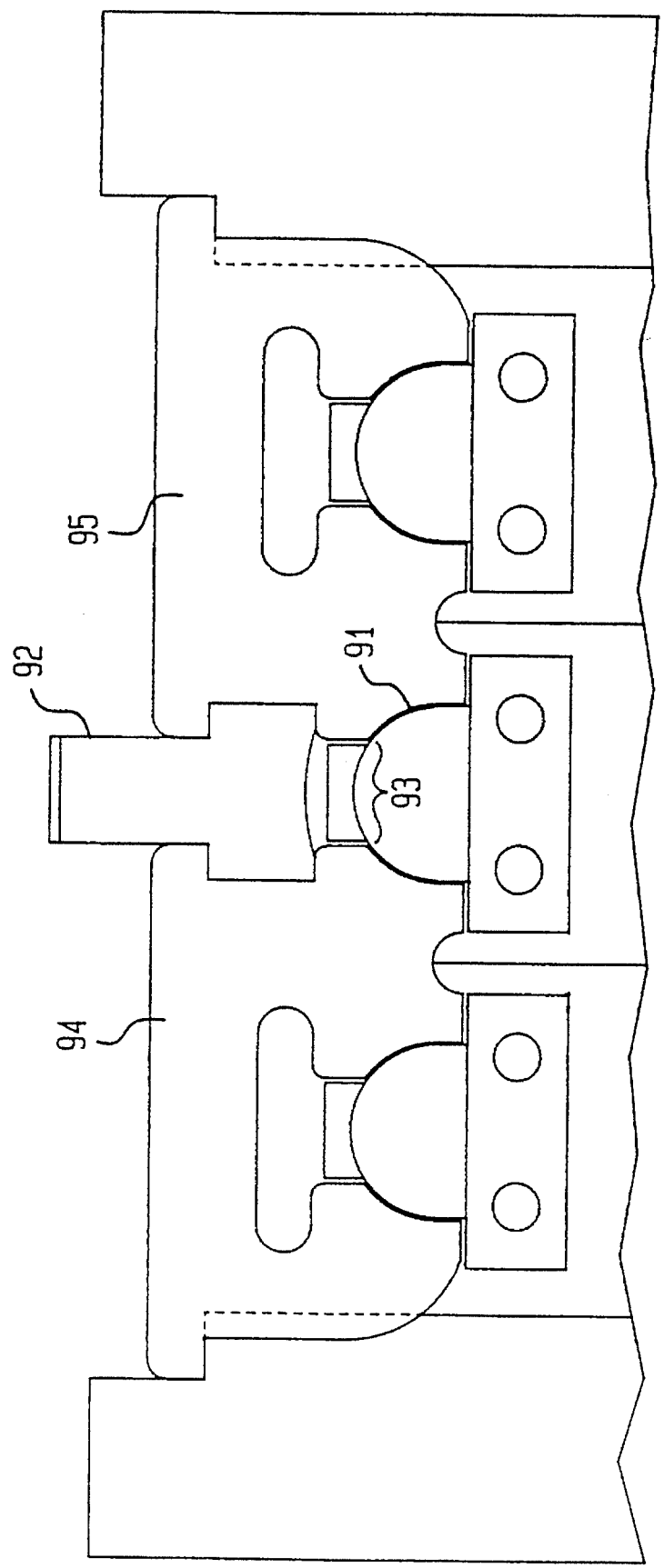

C-STATOR TYPE SEGMENTED ZONED FIELD DC-MOTOR

BACKGROUND OF THE INVENTION

1. Field of the Invention

The present invention generally relates to electrical machines of the linear or rotary type and, more particularly, to motors powered by direct current and of the reluctance or permanent magnet types.

2. Description of the Prior Art

Electrical motors are currently used to provide motive power in many familiar devices ranging from small actuators to large industrial systems and including transportation vehicles such as urban railroads. In many cases, provision of electrical power to such motors presents no serious problem such as in stationary motor installations or where the power requirements are small and battery power is feasible and relatively economical. In transportation vehicles, however, some difficulties arise due to the mobile nature of the application and the amount of power required. For that reason, the use of electrical motors in vehicles has only been become widespread where power can be supplied through a stationary structure to which the vehicle's motion is constrained, such as in electrically powered railway vehicles.

If the vehicle motion is not so constrained, as in automobiles, power must be provided from batteries which are carried in the vehicle, adding significantly to vehicle weight in an amount often comparable to or greater than the payload of the vehicle. During use of the vehicle, the weight of the vehicle and payload, as well as the batteries, must be accelerated repeatedly, requiring substantial amounts of power simply for the transportation of the batteries themselves. Accordingly, efficiency of the motor becomes of paramount importance in such applications in order to develop an acceptable range and operating time of the vehicle for each recharge of the batteries.

The ability to control operating speed of a motor is also of special importance in many applications, including transportation vehicles. While alternating current motor designs have been able to achieve relatively high efficiencies, motor speed in alternating current machines is largely controlled by the frequency of current used to power the machines and only a limited amount of slip (e.g. in induction motors) is tolerable. Variation of the power supply frequency is often impractical where the power is drawn from commercial electric power distribution systems and, in any event, the apparatus necessary for power frequency control over a wide range is extensive and eliminates much of the efficiency advantages of alternating current machines in applications where variable speed is required.

Direct current machines, on the other hand, can provide speed control by control of input power voltage relative to the load with relatively simple electrical circuitry. In traditional DC motors using commutators, the geometry of the stator and rotor fields are substantially fixed and torque and speed vary with voltage or current applied, the load which must be driven and the windage and other losses in the motor, itself.

Highly precise speed control can be achieved with relatively simple pulse generation circuitry driven from a DC power source and so-called stepping motor types of designs. For example, highly precise speed control is provided in sound recording and reproducing equipment and computer storage devices with so-called pancake motor designs which can be made very compact and of particularly small dimension in the direction of the rotational axis as opposed to prior designs in which a long, multiple pole stator and matching rotors were provided in a generally cylindrical shape and with poles extending generally in the same direction as the rotational axis of the motor.

In designs of stepping motors and in pancake motor designs, in particular, magnetic elements such as permanent magnets or elements of high permeance material are placed at periodically spaced locations on a rotor disk and a sequence of pulses applied to stators located periodically around the rotor and in registration with the path of the magnetic elements in order to attract and/or repel them to cause rotary motion of the rotor. Of course, it should be realized that the same electromagnetic action can be applied to a linear motor since the principle of operation of either type of motor requires only that an electrical pulse be applied when there is some separation between a portion of the stator and a portion of the rotor such that a relative force can be produced between them due to the magnetic field resulting from the pulse.

Consider, for example a simple reluctance machine in the form of a solenoid. Generally the stator will carry a coil to which an electrical current pulse can be applied. The coil will be formed in such a way as to cause a magnetic flux in a magnetic circuit. The magnetic circuit could be defined by no more than air surrounding the coil but is usually defined by a coil core of high permeance material formed in a way to define an air gap in the magnetic circuit through which the rotor can pass. Assuming the rotor to also be a body of relatively high permeance material located at a position where the field of the magnetic circuit will link a high permeance element of the rotor but where reluctance of the magnetic circuit will not be at a minimum, the magnetic field produced by current in the stator coil will cause a force on the rotor in a direction which would reduce reluctance of the magnetic circuit (e.g. if the rotor is permitted to move in the direction of the force, reluctance of the magnetic circuit would be reduced). The same principle applies with permanent magnet motors in which a force occurs in a direction to increase magnetic flux in the magnetic circuit established by the coil core.

The same principle of operation can be applied to stepping motor designs to obtain more-or-less continuous motion. This is done by arranging for pulses to be applied to a portion of the stator when a certain separation occurs between a rotor portion location and the location it would assume for minimum reluctance of the magnetic circuit, removing the current from that stator portion at or before the position of minimum reluctance is reached, allowing the momentum of the rotor portion to carry it beyond the position of minimum reluctance and applying another pulse to another stator section to repeat the process. However, it can be readily understood that such a mode of operation may cause substantial rotational noise since the amount of force generated is proportional to the amount of change of reluctance with rotor position.

For acceptable levels of rotational noise some portion of high permeance material must be present in the air gap of some stator portion when the pulse is applied to the appropriate stator portion so that reluctance changes relatively linearly with position as more of the high permeance material is drawn into the air gap. At the same time, the presence of some high permeance material in the air gap limits the total change in reluctance in the course of interaction of one stator portion or pole with one rotor portion, limiting available torque and power of the motor. On the other hand, a larger excursion of reluctance limits the efficiency of the motor since the magnetic flux in the air gap is limited by the total reluctance of the magnetic circuit, requiring more ampere turns to obtain a high flux density when little or no high permeance material is in the air gap. Then, when high permeance material enters the air gap, saturation of the material defining the magnetic circuit is likely to occur; increasing losses and reducing efficiency.

From the foregoing, it can be readily seen that there are important design trade-offs between rotational noise, power per unit volume of the motor and efficiency of the motor. For this reason, motors and generators following a compact pancake design are generally limited to low power applications and higher power requirements have been answered with the prior cylindrical motor configuration.

Further, known rotor geometries of reluctance and permanent magnet machine rotors and stators of the pancake design type are not dimensionally stable with variations in rotational speed of the motor. For this reason, pancake design motors are generally limited to low and constant speed applications; implying low power although moderate torque can be achieved. It should also be recognized that the number of turns of current-carrying winding on a stator coil increases motor weight and size and can require increase of the length of the magnetic path in the stator and thus increase reluctance thereof as well as increasing copper losses in electrical resistance and saturation and iron losses of the coil cores. Therefore, reduction of current requirements through provision of increased numbers of turns in stator coils is somewhat self-limiting. Additionally, the inductance of coils having high numbers of turns increases inductance and extends the time required to establish and collapse a magnetic field in the coil. This increase of inductance also tends to cause rotational vibration and contributes to loss of efficiency of the motor.

SUMMARY OF THE INVENTION

It is therefore an object of the present invention to provide a motor of high efficiency, high power and which may be readily controlled in speed.

It is another object of the invention to provide a motor which exploits flux variation during operation to reduce rotational noise and increase efficiency.

It is a further object of the invention to provide a reluctance or permanent magnet motor of compact size and low weight and yet exhibiting high torque and high power as well as low rotational noise.

It is yet another object of the invention to provide a stator and rotor geometry which is stable with speed variation to provide a low reluctance flux path through the stator and rotor and in which reluctance variation with passage of a rotor pawn through the stator is maximized In order to accomplish these and other objects of the invention, an electrical machine is provided including at least two stators evenly spaced at a stator pitch distance, each of the stators having an air gap and an electrical coil wound thereon, at least one pawn of high permeance material having a cross-sectional dimension sized in accordance with the stator air gap and a length at least equal to the stator pitch distance, and means for applying a sequence of pulses to the two stators.

In accordance with another aspect of the invention, an electrical machine is provided including at least two stators spaced by a stator pitch dimension, at least one pawn of high permeance material which is relatively moveable between the stators and having a length at least equal to the stator pitch dimension, means for energizing one of the at least two stators to move a pawn to a location adjacent another stator and inducing a magnetic field in that pawn, whereby said magnetic field in that pawn is coupled the adjacent stator.

BRIEF DESCRIPTION OF THE DRAWINGS

The foregoing and other objects, aspects and advantages will be better understood from the following detailed description of a preferred embodiment of the invention with reference to the drawings, in which:

FIG. 9 shows a variation of the invention for increasing torque with little increase in weight of the motor.

DETAILED DESCRIPTION OF A PREFERRED EMBODIMENT OF THE INVENTION

Figure 1:
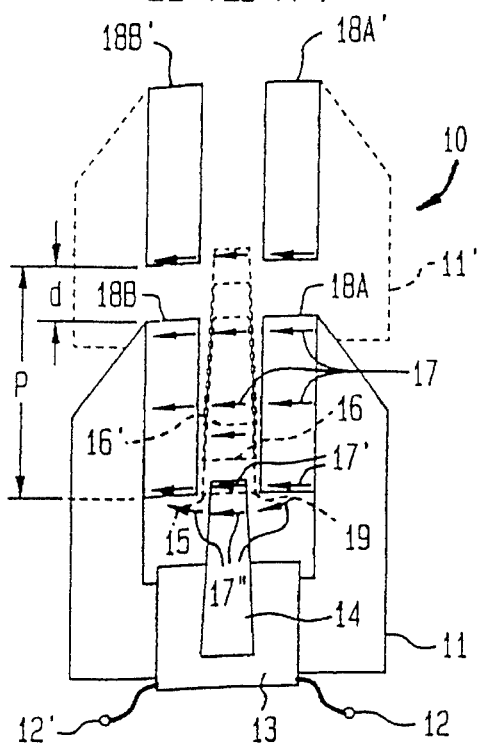
FIG. 1 is a schematic diagram of the stator poles and rotor of a reluctance machine.

Referring now to the drawings, and more particularly to FIG. 1, there is shown a generalized and schematic representation of a reluctance machine 10. It is to be understood that the depiction of FIG. 1 is generalized to facilitate an understanding of the electromagnetic effects which occur in this type of machine. Further, FIG. 1 has been labelled "Related Art" to indicate that the depiction does not employ the salient features of the invention but is specifically not admitted to be prior art as to the present invention. It is to be further understood from the generalization of FIG. 1 that no details of actual structure, particularly as to form or orientation of the stator armature 11, coil 13, or rotor pawn 14, are to be inferred from the depiction in FIG. 1.

In a magnetic circuit, reluctance is analogous to resistance in an electrical circuit. That is, the magnetic flux, along with other parameters of the magnetic circuit will be determined by reluctance for a given magnetomotive force. It is a principle of the operation of reluctance machines that a magnetic flux in a magnetic circuit will cause forces in the portions of that magnetic circuit, which the magnetic flux links, in a direction which would tend to reduce the reluctance of the magnetic circuit. Thus, if a magnetic flux in a magnetic circuit links a moveable member, the member will be accelerated in a direction which will reduce the reluctance of the magnetic circuit.

Applied to the generalized reluctance machine of FIG. 1, a voltage applied to terminals 12, 12' of coil 13 will cause a magnetomotive force (mmf) resulting in a flux in armature 11. Assuming the armature is of a relatively high permeance material (analogous to low resistance in an electrical circuit) and is formed to create an air gap in the magnetic circuit, the reluctance of the circuit and the level of flux in the circuit will be largely determined by the geometry of the air gap and the permeance of any object which may be placed in the air gap.

In this case, consider a tapered body of high permeance material 14 constrained to a path through a stator air gap by a structure (not shown) such as a rotor disk at the location shown (in solid lines). It is to be understood that tapering of this body is not necessary to the observation of the effects by which a reluctance machine operates but can be used to cause certain variations of operation. It is also commonly employed in texts for the purpose of more complete discussion of reluctance machine principles and also permits greater clarity of illustration. As noted above, a voltage applied to terminals 12 of coil 13 will cause a magnetic flux in the circuit formed by armature 11 and the air gap between poles 18A and 18B, as depicted by arrows 17, 17'. This flux also links the end of the magnetically active body of high permeance material 14 (which will be hereinafter referred to, in the context of either a linear or rotary motor, as a rotor pawn or, simply, pawn), as particularly indicated by arrows 17'.

Although in textbook examples, flux across the air gap in generally considered as uniform to simplify computations, the flux lines will be distorted somewhat, depending on the geometry of the air gap, the pawn and the permeance of the pawn material, concentrating, to some degree, the flux which links the end of pawn 14. Since the permeance of armature 11 is not ideal, this distortion of the magnetic flux lines also has some effect on reluctance of the circuit, particularly as the flux approaches saturation of the armature. Thus, the principal effect (for the pawn at the position shown in solid lines) is that due to some flux leakage around the air gap depicted by arrows 17" and the position (and, to a lesser extent, the taper which defines the remaining air gap 19) of pawn 14, a force will be applied to pawn 14 which tends to pull it into the air gap between poles 18A and 18B. As the pawn 14 approaches the position yielding minimum reluctance of the magnetic circuit, indicated by dashed lines 15, the cross-sectional area of the air gap between poles 18A and 18B which will include the high permeance, magnetically active body of the pawn 14 will increase, lowering reluctance of the circuit. If the pawn body 14 is, in fact, tapered as shown, the remaining air gap 19 around the pawn 14 will also be decreased as the pawn proceeds into the air gap, further lowering reluctance of the magnetic circuit. Thus, the change of reluctance with movement of the pawn 14 causes the pawn to be accelerated toward position 15. This force and the resultant acceleration depends on the mmf and the change of reluctance with unit distance of movement of the pawn.

Assuming that the mmf of the circuit is maintained after the pawn has reached position 15, the inertia of the pawn may carry it past position 15 to position 16 or even 16' before increasing reluctance with such further motion causes deceleration and acceleration back toward position 15. This action is basically the action of a solenoid. It should be noted that such deceleration is due only to the change of cross-sectional area of the air gap which is occupied by the pawn and effects due to taper are not present while the maximum transverse dimension of the pawn remains in the air gap. Thus deceleration will be somewhat less than the acceleration from the initial position of pawn 14 and position 15 and yielding a preferred direction of rotation for the motor in accordance with asymmetry of pawn taper.

If, on the other hand, the voltage is removed from terminals 12 at or slightly before the pawn reaches position 15, the magnetic field will collapse and the pawn can continue to position 16' or beyond without deceleration (other than due to load, friction and windage). Assuming another armature 11' and including similar poles 18A and 18B is placed along this path and is energized as the pawn approaches position 16', the process may be repeated; thus providing the continuous action of a motor.

It should be noted that the pawn length in the generalized illustration of FIG. 1 is depicted as about the same length in the direction of motion as that of the poles 18A and 18B of armature 11. This is, in fact, a conventional dimensional relation in practice. However, it should be noted that acceleration of the pawn (particularly a single pawn or plural pawns located with the same angular spacing to simultaneously energized stators) can only be achieved periodically, resulting in rotational vibration. The rotational vibration would be increased if the energization of coil 13 is not terminated at the time the pawn reaches the position of minimum reluctance 15 where acceleration drops to zero since deceleration of the pawn would otherwise occur. Such rotational vibration is often countered by limiting the energization duty cycle and the energization period to locations of the pawn 14 where the geometry will yield relatively constant acceleration as well as seeking to reduce the distance between sequential pole pairs d and reducing pole pitch p. However, dimension d cannot be reduced to zero and acceleration force (e.g. torque) cannot be made invariant. Increase of pole pitch is expensive since it increases the number of coils and armatures which must be provided as well as requiring a pulse generating circuit to provide a correspondingly longer sequence of pulses for each revolution (or repeatable portion of a revolution for each pawn on the rotor) of the motor.

Figure 2A:
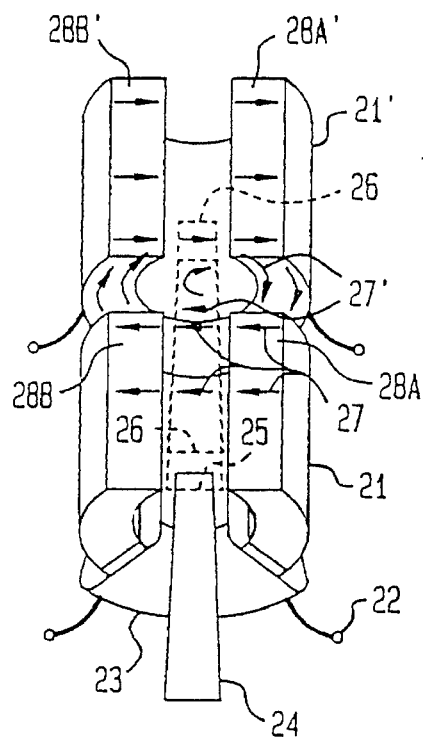
FIG. 2A is a schematic diagram of the stator poles and rotor configuration of a reluctance motor in accordance with the invention.

Referring now to FIG. 2A, a salient feature of the invention will be explained. The inventor has discovered that if the pawn length is extended beyond the distance of pole pitch, including pole separation, certain reductions of rotational noise and other beneficial effects will occur. The inventor has also discovered that these effects can be exploited to achieve substantial increases in efficiency of the motor as well as certain structural improvements and simplifications, as will now be explained.

Consider a pawn 24 at at the position indicated by 24' upon application of a voltage to terminals 22 of coil 23 to generate a magnetic flux in armature 21. The pawn will be pulled into the air gap between poles 28A and 28B as before. The location of minimum reluctance 25 occurs, as in the generalized example of FIG. 1 when the greatest transverse dimension or end of the pawn is flush with the end of poles 28A and 28B. However, if the pawn is of a length at least equal to pole pitch including pole separation in the direction of pawn motion, the front end of the pawn in the direction of motion will now extend at least to and possibly into the air gap between the next pair of poles 28A' and 28B'.

While not wishing to be held to any particular theory of how this reduction of rotational vibration or other beneficial effects of the invention are achieved, the inventor theorizes that the flux in the magnetic circuit including armature 21 and pawn 24 induces a magnetic field in the pawn, as indicated by arrows 27. Where the pawn extends beyond the ends of the poles 28A and 28B, the induced magnetic field will still be present although the shape of the flux lines will be altered by the high permeance of the pawn. That is, outside the air gap between pole pieces 28A and 28B, the permeance of the pawn causes flux lines to form a loop within and extending laterally beyond the pawn in the direction of motion. The curvature of the flux lines is believed to increase with distance beyond the poles 28A and 28B such that at position 25, the direction of the magnetic field at the front end of the pawn will be reversed and may even link the high permeance circuit of the next stator armature 21'. Certainly, at position 26, where the pawn extends significantly into armature 21' the flux will link that armature. It should be noted that even if the energization of coil 23 has terminated before position 25 or 26 is reached, the collapse of the magnetic field is not instantaneous and may be somewhat extended within the pawn due to eddy current and other parasitic effects.

Thus, there is an additional magnetic field in armature 21' (reversed in sense from the field in armature 21) which will assist pulling the pawn further into the air gap of armature 21' and possibly entirely beyond the air gap between poles 28A and 28B before the magnetic field collapses entirely. Therefore it can be seen that the action of the extended pawn both smooths and extends acceleration of the pawn beyond the duration of energization of coil 23 and significantly reduces rotational vibration and noise.

Figure 2B:
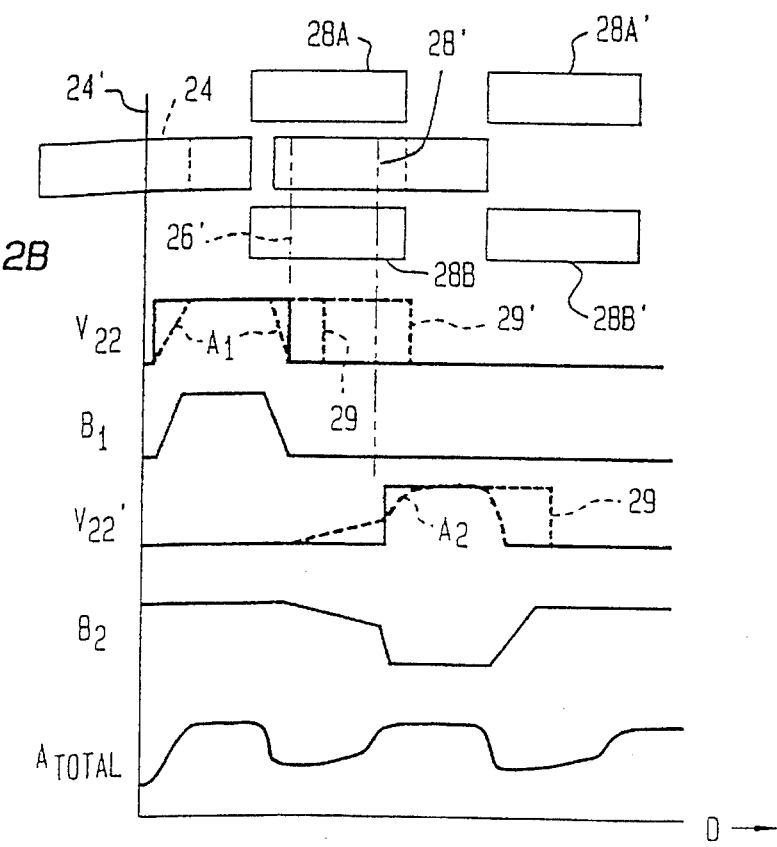
FIG. 2B is a preferred timing diagram for application of electrical current pulses to the stator pole configuration of FIG. 2A, FIGS. 3A and 3B are exemplary shapes of pawn taper profile which can be employed in the practice of the invention.

This extension and smoothing of acceleration and its exploitation to increase motor efficiency will be more fully appreciated from consideration of FIG. 2B. At the top of FIG. 2B, the poles 28A, 28B, 28A' and 28B' are replicated in plan view from FIG. 2A. Pawn 24 is illustrated (without taper to simplify discussion) at three exemplary positions (referenced to its center in the direction of motion) at 24', 26' and 28' (indicated by dashed lines). Pawn position 28' relative to poles 28A' and 28B' is the same as the position indicated at 24 relative to poles 28A and 28B and thus represents the passage of the pawn from one pair of stator poles to the next. The graphs in the lower portion of FIG. 2B are in arbitrary units of voltage, V, magnetic flux, B, and acceleration A (or force) in the vertical direction and the horizontal axis is referenced to instantaneous position of the pawn center line in the direction of motion.

Assuming the pawn 24 is initially at location 24' so that it can be linked by a magnetic field (or at least a fringe field) between poles 28A and 28B, a voltage $V_{22}$ can be applied to coil 22, causing development of magnetic flux $B_1$ across the air gap (also idealized for clarity: the flux will actually increase as reluctance of the magnetic circuit decreases) and acceleration of the pawn will increase, as indicated by the dashed line $A_1$. This solenoid-like action produces very rapid acceleration of the motor to running speed. Assuming here for simplicity that the pawn 24 is not tapered, this acceleration $A_1$ will drop to zero at position 26' as the front end of pawn 24 becomes flush with the (right-hand, in this depiction) end of poles 28A and 28B. Therefore, there is no need to extend the duration of $V_{22}$ beyond the point depicted. Thus the pawn motion continues under its own inertia. If the pawn is not tapered, it should be noted, however, that not reverse acceleration will occur until the trailing edge of the pawn begins to leave the air gap between poles 28A, 28B, even though the pulse may be continued, for example, to the time 29, although no further forward acceleration is produced. Conversely, if the pawn is tapered over its full length, as in FIG. 2A, or a lesser portion of its length, some further acceleration may be achieved over the extent of the taper.

As noted above, the collapse of magnetic field $B_1$ is not instantaneous and occurs somewhat more slowly than the magnetic field develops when $V_{22}$ is applied. This duration of time over which the magnetic field collapses depends principally on the inductance of the coil and the time constant of the drive circuit as well as some parasitic effects and can be controlled to some degree by design of the stator and stator coil (e.g. favoring a low number of stator coil turns), It is believed that the magnetic field in the pawn collapses even more slowly due to eddy currents and other parasitic effects and the extension of the duration of that field may be augmented by some degree of remanence of the pawn.

As the motion of the pawn continues, the collapsing but still extant field of the pawn begins to link the poles 28A' and 28B' as can be seen in the graph of $B_2$ and a corresponding acceleration $A_2$ is caused in advance of application of a voltage $V_{22}'$. The application of $V_{22}'$ returns the acceleration of the pawn to a high level for the duration of the pulse until the front end of the pawn reaches a point where it is flush with the (right-hand) ends of the poles 28A' and 28B' and the pulse $V_{22}'$ can be terminated. As before, the induced and permanent field of the pawn begins to link the next stator armature and the acceleration does not fall to zero.

It should also be noted that since no acceleration is produced after the pawn reaches position 26' other than that produced by tapering of the pawn, if any, no work is done and no energy is consumed from 26' to 29 in driving the pawn, other than the energy attributable to coil resistance (e.g. so-called copper losses) and other very minor parasitic effects. Therefore there is little loss of efficiency due to continuance of the drive pulse $V_{22}$ to time 29 or beyond. However, it has been found that if the field $B_1$ is continued, the field induced in the pawn can be continued until substantial linkage of the induced field in the pawn with pole 28A', 28B' is achieved. While some energy is consumed due to this linkage, acceleration will again be produced and substantial recovery of that energy can evidently be achieved due to the reduction in energy required to establish a magnetic field in the succeeding stator coil having poles 28A', 28B'. This effect, then requires very little additional energy input to the motor while greatly decreasing rotational vibration, virtually eliminating reverse torque and realizing substantial gains in efficiency since fringe fields of the pawn are now exploited to produce additional acceleration force. While the duration of the drive pulse is not particularly critical to the practice and exploitation of this feature of the invention, it is believed that maximum efficiency will be achieved when the drive pulses applied to successive stator coils overlap to the extent of about 1% to 5% of pole pitch, assuming a pawn length approximately equal to stator pole pitch including stator separation. As will be understood by those skilled in the art, however, the optimum duration of drive pulses will also vary with the relationship of pawn length to stator pole pitch with longer pawns tending to reduce or eliminate the amount of overlap which may result in increase of efficiency.

Thus the process of attracting a pawn into a stator air gap, inducing a magnetic field in a rotor pawn and linking that field to a next succeeding stator core can be continued indefinitely to form either a linear or rotary motor of reduced vibration due to irregularity of acceleration of the pawn and increased efficiency since the coupling of the collapsing and remanent magnetic field in the pawn to the succeeding stator armature prior to energization of the succeeding stator allows additional power to be extracted from the magnetomechanical system. Further, the coupling of the magnetic field of the pawn can be further exploited by driving every other (e.g. odd or even ones) stator in the reverse direction from the fields of preceding and succeeding stators. In other words, as alluded to above, the initiation of a flux by coupling of the collapsing and remanent field in the pawn and following with energization of the stator to develop a magnetic flux in the same direction requires less input power or energy to develop a full flux field with the flux level approaching saturation of the armature or core of that stator.

Incidentally, it is not necessary to reverse connections, provide drive pulses of different polarities or otherwise electrically provide for the reversal of fields of adjacent stators although any of these or other approaches could be adopted. The preferable method of achieving this alternation of field direction is simply to reverse the direction of mounting of alternating individual stator coils to a stationary frame.

Additionally, for a full understanding of the invention, it should be appreciated that the length of the pawn as illustrated in FIG. 2B is slightly shorter than the stator pitch and separation, which is not preferred. The invention would be operable, however, if that sum is reduced by no more than the length of significant levels of the fringe field of the pawn. Such a geometry is not preferred since such an example represents a limit of operation in accordance with the present invention (as distinct from the operation of known reluctance motors) and under which conditions reduction of vibration due to uneven pawn acceleration is to be marginally observed. Variation of acceleration is markedly reduced when pawn length equals or exceed the sum of stator pole length and separation (e.g. pole pitch) and vibration continues to decrease with increase of pawn length up to about 1.5 times stator pitch.

It is important to a full appreciation of the invention that in the above example in which the pawn is not tapered and is longer than the stator poles that no acceleration or deceleration of the pawn will occur regardless of the energization state of the coil corresponding to the poles while the ends of the pawn body are outside the air gap. That is, in such a case, there is a range of motion of the pawn which will not change the reluctance of the magnetic circuit. This range of motion has the effect of deferring the time of onset of reverse acceleration (and further forward acceleration force may be obtained from pawn taper) if the drive pulse is extended and thus may be exploited to advantage by extending the drive pulses somewhat longer than might appear to be optimum in order to provide coupling of the induced field in the pawn to the next stator armature. Coupling of this induced field prior to the time when it begins to collapse further reduces variation of acceleration and improves efficiency of the motor. This can be done whether or not tapering of the pawn is employed.

Figure 3A:
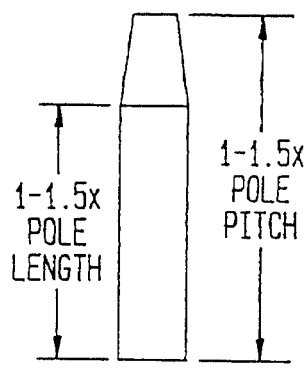
Figure 3B:
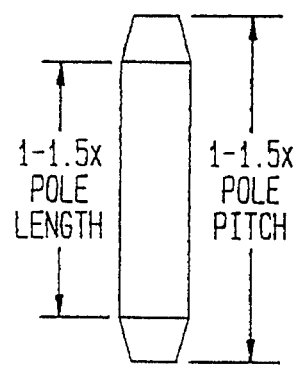

Finally, tapering of the pawn is done for the principal purpose of avoiding any initial location of the pawn at which the motor could fail to be started by application of a sequence of pulses to a corresponding sequence of stator coils and/or for the purpose of providing a preferred direction of rotation upon starting the motor. It has been found that only a very slight amount of tapering of the pawns is necessary to achieve either purpose and a total taper in the range of 0.002–0.005 inches is preferred. The taper need not extend over the full length of the pawn, as shown in FIG. 3A and could be placed at one or both ends of the pawn with a central cylindrical (or rectangular prism) region of the pawn equal to or exceeding the pole width (e.g. length in the direction of pawn motion), as illustrated in FIG. 3B is preferred for assuring that the motor will always start and without a preferred direction of rotation. Even when a preferred direction of rotation is provided by asymmetrical tapering, the motor can be made to run in either direction with only a slight difference in efficiency and rotational vibration if the taper is kept small, as is preferred. The length of the pawns overall is preferably in the range of 1.0 to 1.5 times the pole pitch (tending to overcome any reverse acceleration from tapering of the pawns, if the motor is run in the reverse direction) and the above discussed range of motion after acceleration and without deceleration may be preferably provided by providing a region without taper which is 1.0 to 1.5 times the pole length. a preferred factor for both is 1.3.

Figure 4A:
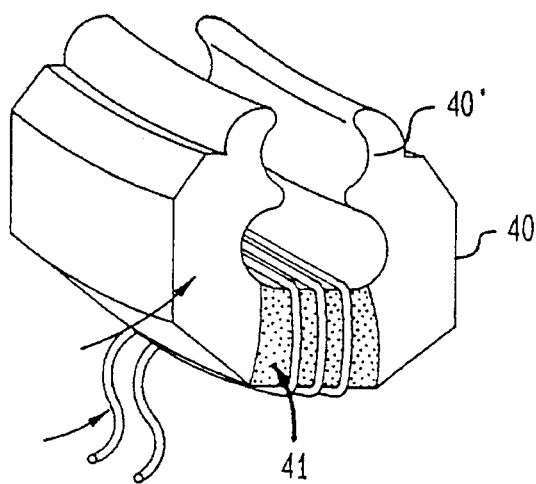
FIGS. 4A and 4B are perspective views of a C-stator coil and rotor pawn in accordance with one embodiment of the invention.
Figure 4B:
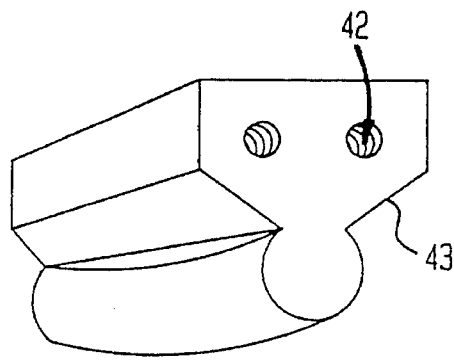

Referring now to FIGS. 4A and 4B, a preferred form stator and rotor pawn are shown, respectively. Assuming use in a rotary motor, matching arcuate forms are used for both the C-stator 40 and the pawn 43. In regard to FIG. 4A, it should be noted that the C-shaped form of the stator 40 provides an extremely short path for the magnetic circuit and the curved pole piece faces 40' provide a very small air gap around the pawn. Therefore high flux densities very near to saturation can be achieved with only a small number of turns of the coil 41. Further, the curvature of the pole pieces provides a large area of the narrow air gap which is substantially greater than the cross-sectional area of the flux path through the pawn, reducing minimum reluctance which can be achieved. This smaller minimum reluctance allows substantial forces to be achieved in accordance with general principles of reluctance machinery without excessive tapering of the pawns. In other words, a relatively large ratio of maximum and minimum reluctance can be achieved with a lower average reluctance which, in turn, permits more constant flux levels for a constant or only slightly adjusted mmf. This allows the flux levels to be kept closer to saturation at all times for greatest efficiency.

Figure 6:
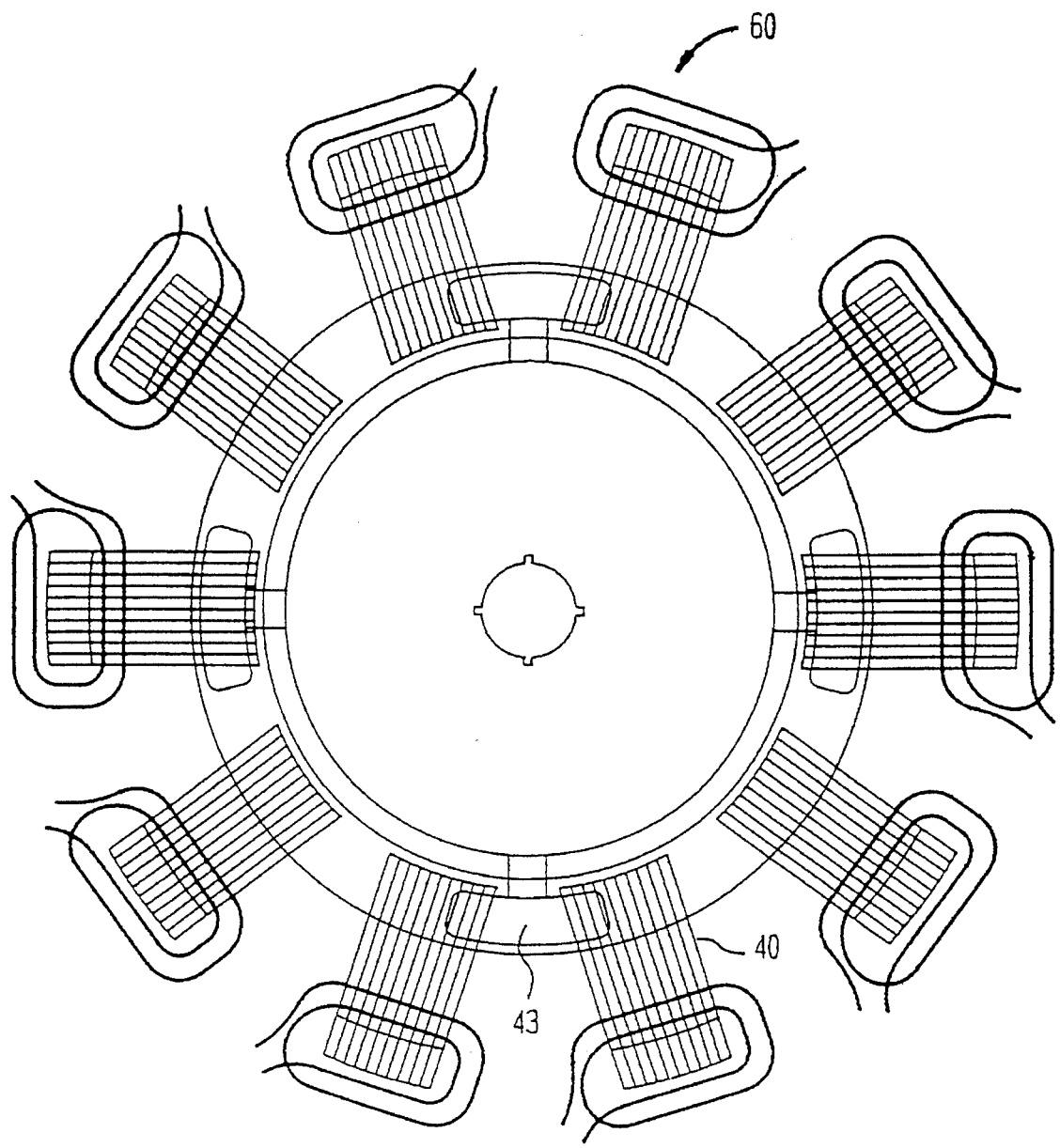
FIGS. 6 and 7 are an end view and cross-sectional view, respectively, of the motor in accordance with the invention.

In regard to the pawn shown in FIG. 4B, it should be noted that the form of the entire pawn body 43 is bilaterally symmetrical since it is preferred that it be mounted on the periphery of a rotor disk (with set screws, not shown, preferably provided in threaded apertures 42 for accurate angular positioning) from which the magnetically active portion of the pawn 24' extends, as also shown in FIG. 6; the magnetically active body portion of the pawn having been described above with reference to body 24 of FIG. 2. In such a case, the only variation in forces borne by the rotor disk structure are in tension in the plane of the disk. This configuration is very dimensionally stable with variations in rotational speed and can be scaled to develop virtually any desired level of torque while maintaining very close clearances between the rotor pawn and the C-stators. It is also to be understood that the close clearance enhances coupling of the induced, collapsing and/or remanent field from the rotor pawn to the succeeding stator armature as described above in regard to FIGS. 2A and 2B.

Figure 5A:
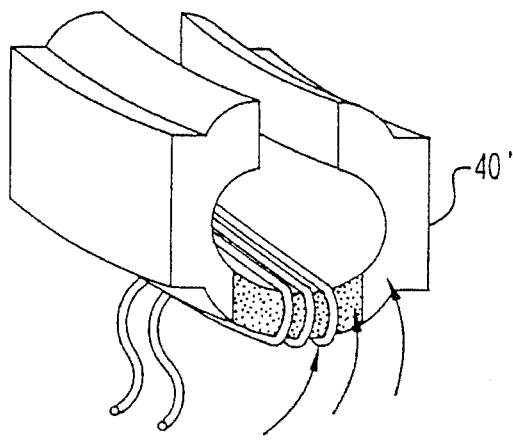
FIGS. 5A and 5B are perspective views of a C-stator coil and rotor pawn in accordance with another embodiment of the invention.
Figure 5B:
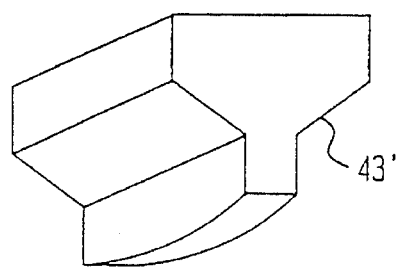
Figure 7:
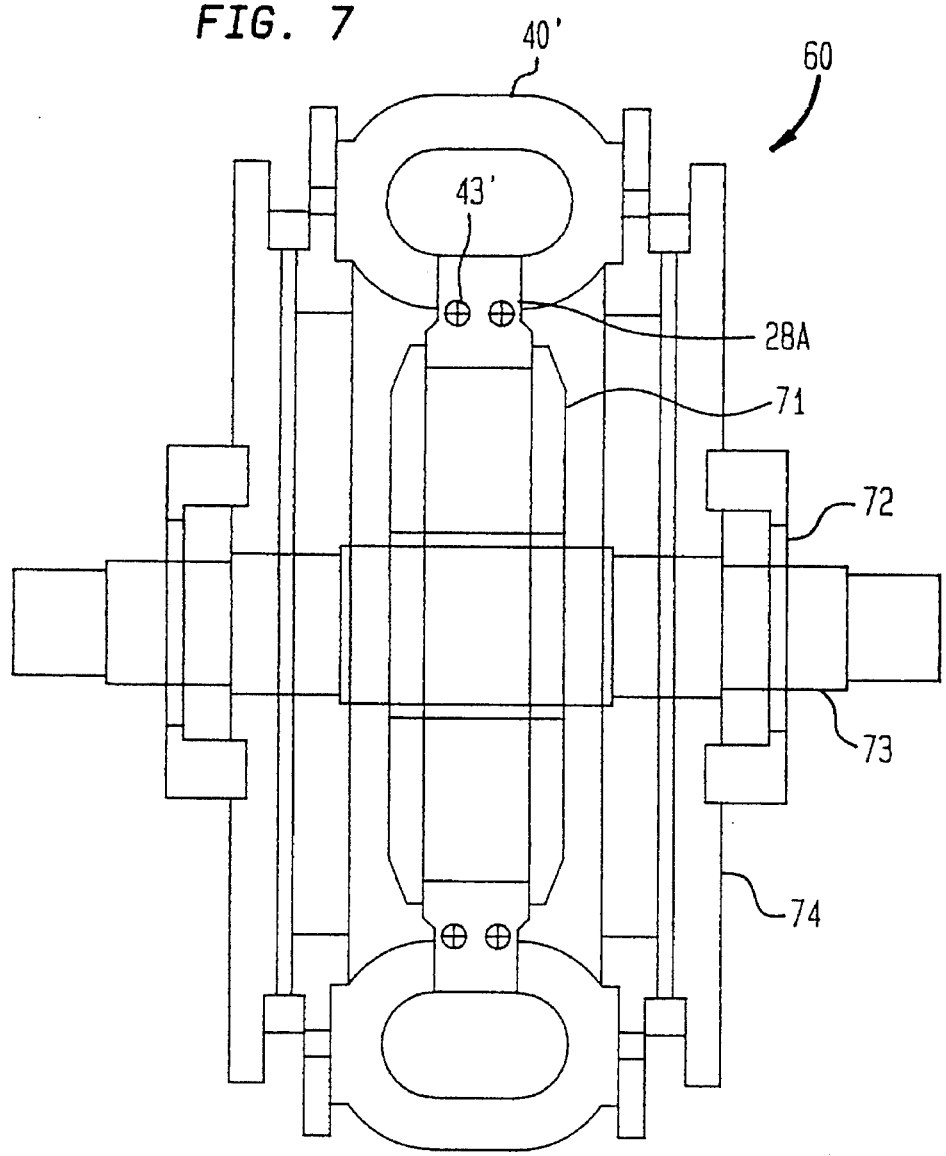

FIGS. 5A and 5B show an alternative form of the stator and rotor, respectively. In this case, the magnetically active portion 24 of pawn 43' is essentially rectangular in functional cross-section. While the area of the air gap is somewhat reduced from that of FIGS. 4A and 4B to roughly equal the cross-sectional area of the flux path through the pawn, dimensional changes in the direction of the rotor disk diameter are non-critical and may allow for lighter constructions. It should also be understood and appreciated that FIGS. 4A, 4B, 5A and 5B represent examples within a continuum of shapes (e.g. oval, elliptical, interdigitated grooves, etc.) by which area of the air gap and criticality of dimensional change with rotational speed can be adjusted. This dimensional stability over a wide range of speeds can be particularly appreciated by reference to the cross-sectional view of the entire motor in accordance with the invention and using the C-stator and pawn shape of FIGS. 5A and 5B, as shown in FIG. 7.

Figure 4C:
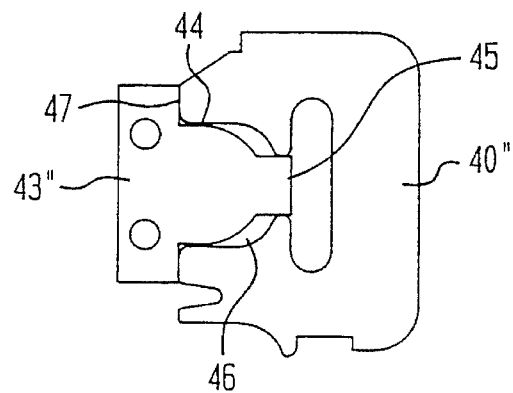
FIG. 4C is a cross-sectional view of a stator and pawn configuration in accordance with a further embodiment of the invention.

FIG. 4C shows, in cross-section, a further and preferred variation of pawn 43" and C-stator 40" shape. In this case, a modified, semi-circular cross-section portion 44 with a radially extending ridge 45 (similar to that of FIG. 5B) is used to increase the air gap area and direct the magnetic field into a greater portion of the volume of the pawn (e.g. at air gaps 47 where the field will extend in a substantially radial direction. This configuration also extends the length on the C-stator over which the coil may be distributed for more efficient coupling of the coil to the core or armature of the C-stator. In this variation of the invention, tapering in accordance with any of the profiles shown in FIGS. 2A, 3A or 3B is preferably provided only in regions 46.

FIG. 6 shows a cut-away axial view of an embodiment of a motor 60 in accordance with the invention. In this case four pawns 43 are used, spaced in diametrically opposed pairs to interact with stators in the same fashion on opposite sides of the rotor. Ten C-stators 40 are used to drive the pawns. Other numerical combinations of pawns and C-stators which are usable together (where the pawns are axially opposed in pairs) to provide guidance in the practice of the invention are:

| Rotor Pawns | C-Stators |
| --- | --- |
| 4 | 10 |
| 6 | 14 |
| 8 | 18 |
| 10 | 22 . . . etc. |

Essentially, the preferred relationship of the number of pawns and C-stators necessary for the successful practice of the invention (where the pawns are axially opposed in pairs) is that there should be two C-stators for each pawn, with the pawns provided in diametrically opposed pairs on the rotor (e.g. four C-stators for each pair of pawns) with an additional two C-stators to provide for an offset of phase between pairs of pawns. This is so that any particular pawn may be attracted into the air gap of a first stator and then proceed to couple the induced, collapsing and/or remanent field to the next C-stator which is not, at that time, energized or interacting with any other rotor pawn.

Of course, the above table and relationship should be understood to reflect preferred minimum numbers of stators corresponding to given numbers of pawns for smooth running and good operation. However, the use of additional stators is possible and may result in increased smoothness of operation, faster and smoother starting acceleration, etc. For example, with eight pawns, eighteen, twenty or even twenty-two stators can be used with the total number of stators distributed to provide closer spacing in phase between groups of pawns.

Other combinations of numbers of pawns and stators are possible and will be apparent to those skilled in the art in view of this description and the above guidelines. For example, radially symmetrical groups including odd numbers of equiangularly spaced pawns could be used and the phase separation of groups of pawns should be equally distributed over the pole pitch (e.g. for three groups of pawns, the phase separation should be equal to the pole pitch divided by three). Thus, more generally, if there are M groups of pawns with N pawns each, the number of C-stators should be M(2N+1).

FIG. 7 shows an embodiment of a motor 60 in accordance with the invention in a cross-sectional side view. This embodiment uses the C-stator 40' and pawn 43' configuration of FIGS. 5A and 5B but the embodiment of FIGS. 4A and 4B or that of FIG. 4C could be used. The pawns 43' are preferably mounted in symmetrical relation on the peripheral edge of rotor 71 so that variation in rotational speed results only in variation in tension within the rotor for maximum dimensional stability. Rotor 71 is positioned on rotor shaft 73 which runs in bearings 72 for positioning with respect to the motor frame 74 which in turn provides for mounting of C-stators 40'. It is possible to use only a single frame member 74 but symmetrically placed frame members 74 are preferred to enhance accuracy of positioning of the C-stators in view of the large acceleration forces which can be produced by the motor in accordance with the invention.

It can be clearly appreciated from this view that for a given degree of reluctance change of a pawn through any particular C-stator, any desired torque can be achieved by choice of rotor diameter. Alternatively, for a given rotor diameter, torque can be multiplied by providing additional rotors on a common shaft and additional C-stators mounted on a further stator frame. Angular skewing of additional rotors can further reduce rotational noise but at the expense of additional drive circuitry for each rotor. Fine positioning of the C-stators and the rotor pawns about the circumference of the rotor can be achieved with a set screw or other known mechanical expedient.

Alternatively, it is possible to further increase torque and power by providing for additional pole piece faces on the stators and additional rotors having pawns running essentially in the fringe fields between stators. An exemplary arrangement having these features is shown in FIG. 9. The pawn and C-stator shape shown in FIG. 4C is particularly advantageous in this embodiment of the invention. Specifically, by providing preferably concave or otherwise shaped portion or recess 91 on one end (or both ends for the central C-stators where three or more C-stators are used) and completing the magnetic circuit including air gap 93 with an additional frame member 92 (or simply by placing the C-stators adjacent each other, or the like), an additional air gap is formed in which the pawns of an additional rotor can run. It should be remembered that if the two C-stators 94, 95 are energized in the same sense, the fringe fields of each C-stator will cause a field across air gap 93 in the opposite direction which will be similar in magnitude to that of the individual C-stators due to modification of the fringe fields by the mutual proximity of the C-stators. Thus the addition of only a rotor disk (or other structure for a linear motor) need be added to obtain a substantial increase in torque and efficiency and the additional weight of further C-stators can be avoided.

Figure 8:
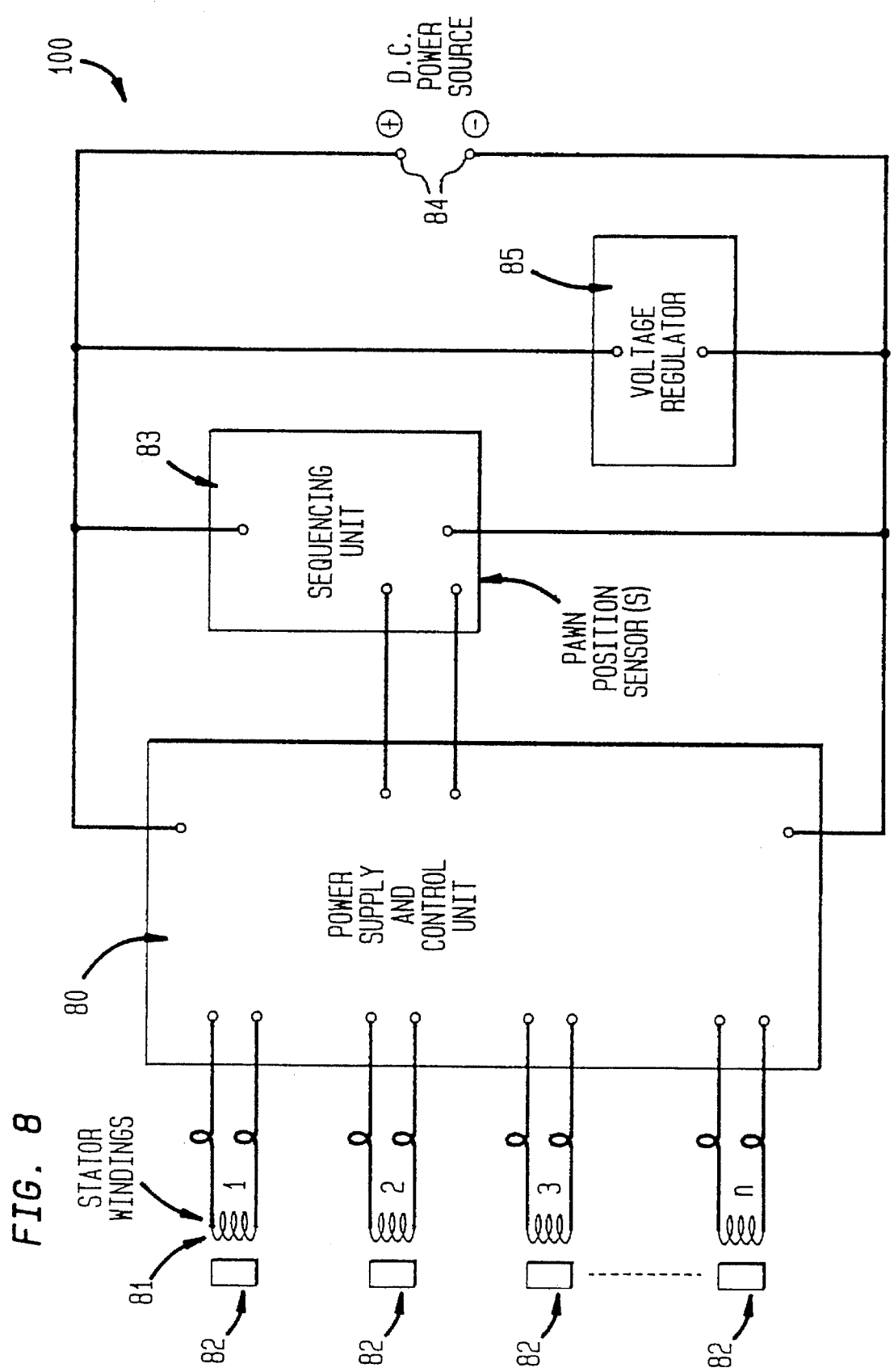
FIG. 8 is an exemplary arrangement for production of suitably timed current pulses.

An exemplary firing circuit 100 is schematically shown in FIG. 8. A voltage regulator or control 85, a sequencing unit 83 and the power supply and control unit 80, preferably including triacs or silicon controlled rectifiers for switching power pulses to the C-stators, all may receive power from a single D.C. power source 84 or separate sources of power may be provided. The sequencing unit 83 preferably receives some inputs from sensors for detecting the position of the rotor or at least one pawn thereon, from which the duration and timing of the pulses in accordance with FIG. 2B can be derived and applied to the C-stators. Circuits of this general type are well-known and a detailed description is not necessary to the successful practice of the invention by those skilled in the art. However, it is desirable that the frequency of pulse generation be made variable to obtain speed variation of the motor. Also, while not critical, it is desirable that the pulse width of the driving pulses be made to vary with the frequency of the pulse sequence. While the motor in accordance with the invention inherently keeps variation of flux with changes in reluctance at a reduced level so that the magnetic circuits in the stators can be kept close to saturation, it is also possible to shape the pulses somewhat to further regulate flux levels to enhance efficiency.

In view of the foregoing, it is seen that the invention provides a motor of low rotational vibration and noise high efficiency and acceleration in which no reverse torque occurs due to magnetic field coupling to unactuated stators and which may be readily controlled as to speed and/or direction of rotation. In general, the invention allows a decrease in stator pole pitch (resulting in reduced cost for a reduced number of C-stators) and increase of pawn length while allowing the C-stators to be kept close to saturation during drive pulses; the combination of features resulting in high efficiency at reduced motor cost. The solenoid-like action results in fast acceleration and high power to weight ratio of the motor in accordance with the invention while short magnetic flux paths and reduced reluctance levels allow high performance even at relatively low operating voltages. Variation of flux with reluctance is kept low so that the magnetic circuits defined by the C-stators can be kept close to saturation for increased efficiency.

While the invention has been described in terms of a single preferred embodiment, those skilled in the art will recognize that the invention can be practiced with modification within the spirit and scope of the appended claims. For example, while the invention has been described in terms of a reluctance machine, the same principles of field coupling from rotor pawns to unactuated stators can be applied to permanent magnet pawns, in which case field polarity of the c-stators would not be alternated. However, the advantages of the minimized air gap by use of the closely fit pawns and C-stator air gap and the reduction of vibrational noise due to the extended pawn length would continue to accrue. Dimensional stability of the rotor with speed variation would also be retained in a permanent magnet embodiment of the invention.

Having thus described my invention, what I claim as new and desire to secure by Letters Patent is as follows:

1. An electric machine including:
   at least two stators spaced at a stator pitch distance in a direction, each of said at least two stators providing an independent magnetic circuit arranged to carry flux generally orthogonal to said direction, each of said at least two stators having an air gap in said magnetic circuit and having an electrical coil wound thereon,
   at least one pawn having a magnetically active portion comprising a magnetic element having a functional cross-section passing through said air gap for carrying flux in said magnetic circuit, said functional cross-section being sized in accordance with said air gap, said magnetically active portion of said pawn having a length passing through said air gap at least equal to said stator pitch distance and greater than a length of said air gap of said magnetic circuit of each said stator in said direction, and
   means for applying a sequence of pulses to said at least two stators.

2. An electrical machine as recited in claim 1, wherein said length of said at least one pawn is in the range of 1.0 to 1.5 times said stator pitch distance.

3. An electrical machine as recited in claim 1, wherein said length of said at least one pawn is approximately 1.3 times said stator pitch distance.

4. An electrical machine as recited in claim 1, wherein said at least one pawn and said air gaps of said at least two stators have a circular cross-sectional shape.

5. An electrical machine as recited in claim 1, wherein said at least one pawn and said air gaps of said at least two stators have a rectangular cross-sectional shape.

6. An electrical machine as recited in claim 1, wherein an area of a surface of a pole of said at least two stators at said air gaps exceeds a cross-sectional area of a flux path across said air gap through said at least one pawn.

7. An electrical machine as recited in claim 1, wherein said at least one pawn is tapered over substantially the full length of said at least on pawn.

8. An electrical machine as recited in claim 1, wherein said at least one pawn is of substantially constant cross-section over a portion of the length of said at least one pawn which is at least equal to a length of one of said at least two stators.

9. An electrical machine as recited in claim 8, wherein said at least one pawn has a tapered portion at one end thereof.

10. An electrical machine as recited in claim 8, wherein said at least one pawn has a tapered portion at both ends thereof.

11. An electrical machine including:
    at least two stators spaced at a stator pitch dimension in a direction, each said stator providing an independent magnetic circuit arranged to carry magnetic flux generally orthogonal to said direction and having an air gap,
    at least one pawn comprising a magnetic element having a magnetically active portion passing through said air gap and carrying said flux of said magnetic circuit across said air gap and which is relatively moveable between and through said air gaps of said at least two stators, said magnetically active region of said at least one pawn having a length at least equal to said stator pitch dimension, and
    means for energizing one of said at least two stators to pass magnetic flux through said magnetically active region of said at least one pawn within said air gap to move an end of said magnetically active portion of said at least one pawn to a location adjacent an air gap of another of said at least two stators.

* * * * *